United States Patent [19]

Itoh et al.

[11] Patent Number: 5,406,548
[45] Date of Patent: Apr. 11, 1995

[54] LINE ACCOMMODATION CIRCUIT CAPABLE OF SWITCHING FROM AN ACTIVE SYSTEM TO A STANDBY SYSTEM WITHOUT A LOSS OF A COMMUNICATION INFORMATION SIGNAL

[75] Inventors: Chikashi Itoh; Hiromi Takahashi, both of Tokyo, Japan

[73] Assignee: NEC Corporation, Tokyo, Japan

[21] Appl. No.: 162,286

[22] Filed: Dec. 7, 1993

[30] Foreign Application Priority Data

Dec. 8, 1992 [JP] Japan .................................. 4-351454

[51] Int. Cl.6 .......................... H04J 1/16; H04L 12/26
[52] U.S. Cl. ........................................ 370/16; 370/60;
371/8.1; 340/827
[58] Field of Search ........................... 370/16, 94.1, 60;
340/827; 371/8.1, 8.2, 11.1, 11.2

[56] References Cited
U.S. PATENT DOCUMENTS 5,295,134 3/1994 Yoshimura et al. ................... 370/16

Primary Examiner—Douglas W. Olms
Assistant Examiner—Dang Ton
Attorney, Agent, or Firm—Sughure, Mion, Zinn, Macpeak & Seas

[57] ABSTRACT

A line accommodation circuit for use in combination with a cell exchange apparatus to convert a sequence of input data signals into a sequence of asynchronous transfer mode cells is provided with two function systems which are identical in structure. The systems receive the input data signals in parallel and are switched from an active system to a standby system by a switching operation indicated by a system controller. Switching is affected by inserting a test cell in the active system after a last one of the asynchronous transfer mode cell held in the active system, and placed in the standby system before a following asynchronous transfer mode cell. The test cell is first detected by the standby system and thereafter by the active system, at which time the next asynchronous transfer mode cells are sent from the standby system which is rendered into a new active system.

8 Claims, 6 Drawing Sheets

LINE ACCOMMODATION CIRCUIT CAPABLE OF SWITCHING FROM AN ACTIVE SYSTEM TO A STANDBY SYSTEM WITHOUT A LOSS OF A COMMUNICATION INFORMATION SIGNAL

BACKGROUND OF THE INVENTION

This invention relates to a line accommodation circuit for use in combination with a cell exchange apparatus in a digital electronic exchange system. It is to be noted throughout the instant specification that the line accommodation circuit is given a wide variety of communication information signals and serves to convert the communication information signal or signals into an asynchronous transfer mode (ATM) cell and to send each ATM cell to the cell exchange apparatus.

In general, such a line accommodation circuit is connected to input and output lines through which the communication information signals are transmitted in the form of an input data signal and an output data signal. Each of the input and the output data signals is transmitted at a low bit rate in comparison with the ATM cell formed in the line accommodation circuit.

Specifically, the line accommodation circuit has a redundancy structure and comprises a pair of function systems one of which acts as an active system and the other of which acts as a backup or a standby system. The active and the standby systems will be often abbreviated to ACT and SBY systems, respectively, and are switched from one to another on occurrence of a fault or the like.

Herein, let the line accommodation circuit be given as the input data signal a synchronous data signal which includes a frame synchronization signal. Under the circumstances, it is assumed that the active system is switched to the standby system with reference to the frame synchronization signal to switch the synchronous data signal from the active system to the standby system. However, the line accommodation circuit does not have structure such that all sections or elements of the line accommodation circuit are synchronously operated. Therefore, a frame loss or a loss of the synchronous data signal often takes place on such a switching operation from the active system to the standby system.

On the other hand, it is assumed that an asynchronous data signal like a packet signal is given as the input data signal to the line accommodation system and is switched from the active system to the standby system. In this case, an input operation of the asynchronous data signal is temporarily interrupted during such a switching operation while received and stored asynchronous data signals should be transferred from the active system to the standby system. With this structure, it takes a long time to transfer the stored asynchronous data signals from the active system to the standby system. As a result, a long time is required for the switching operation. In addition, complexed control operation or procedure should be carried out in the line accommodation circuit.

SUMMARY OF THE INVENTION

It is an object of this invention to provide a line accommodation circuit which is applicable to switching operation of both synchronous and asynchronous data signals.

It is another object of this invention to provide a line accommodation circuit of the type described, which can avoid a loss of a communication information signal during the switching operation from an active system to a standby system.

It is still another object of this invention to provide a line accommodation circuit of the type described, which can quickly carry out the switching operation.

It is yet another object of this invention to provide a switching method of quickly switching the active system to the standby system in the line accommodation system.

A line accommodation circuit to which this invention is applicable is supplied with a sequence of input data signals to supply a sequence of output asynchronous transfer mode cells to a cell exchange apparatus. The line accommodation circuit comprises a first function system which is operated as an active system and a second function system which is identical in structure with the first function system and is operated as a standby system. The input data signal sequence is synchronously sent to both the active and the standby systems.

According to this invention, each of the first and the second function systems comprises a system controller for carrying out a switching operation between the active and the standby systems to render the first and the second function systems into a new standby system and a new active system, respectively, a controllable cell processor controlled by the system controller for successively carrying out, under control of the system controller, a conversion operation of the input data signals into internal asynchronous transfer mode cells corresponding to the output asynchronous transfer mode cells, a cell insertion circuit coupled to the system controller for producing, under control of the system controller, a predetermined cell distinguished from the internal asynchronous transfer mode cells, an input buffer coupled to the system controller for storing the internal asynchronous transfer mode cells and the predetermined cell to produce the internal asynchronous transfer mode cells and the predetermined cell as stored asynchronous transfer mode cells and a stored predetermined cell, respectively, under control of the system controller, a cell detector coupled to the system controller and the input buffer for detecting the stored predetermined cell to supply a detection signal to the system controller on detection of the stored predetermined cell and, otherwise, to allow the stored asynchronous transfer mode cells to pass therethrough under control of the system controller, and an output circuit coupled to the system controller and the cell detector for producing the stored asynchronous transfer mode cells as the output asynchronous transfer mode cells under control of the system controller.

The active system is controlled on the switching operation by the system controller so that the cell processor in the active system stops the conversion operation during the switching operation while the cell insertion circuit in the active system produces the predetermined cell after a last one of the internal asynchronous transfer mode cells that is left in the cell processor of the active system is sent to the input buffer in the active system.

On the other hand, the standby system is controlled on the switching operation by the system controller so that the cell processor in the standby system starts the conversion operation after the predetermined cell is sent from the cell insertion circuit to the input buffer in the standby system, to store, in the input buffer of the standby system, a following one of the internal asynchronous transfer mode cells that succeeds the last one of the asynchronous transfer mode cells, with the following one of the internal asynchronous transfer mode cells preceded by the predetermined cell in the input buffer of the standby system.

DESCRIPTION OF THE PREFERRED EMBODIMENT

Figure 1:
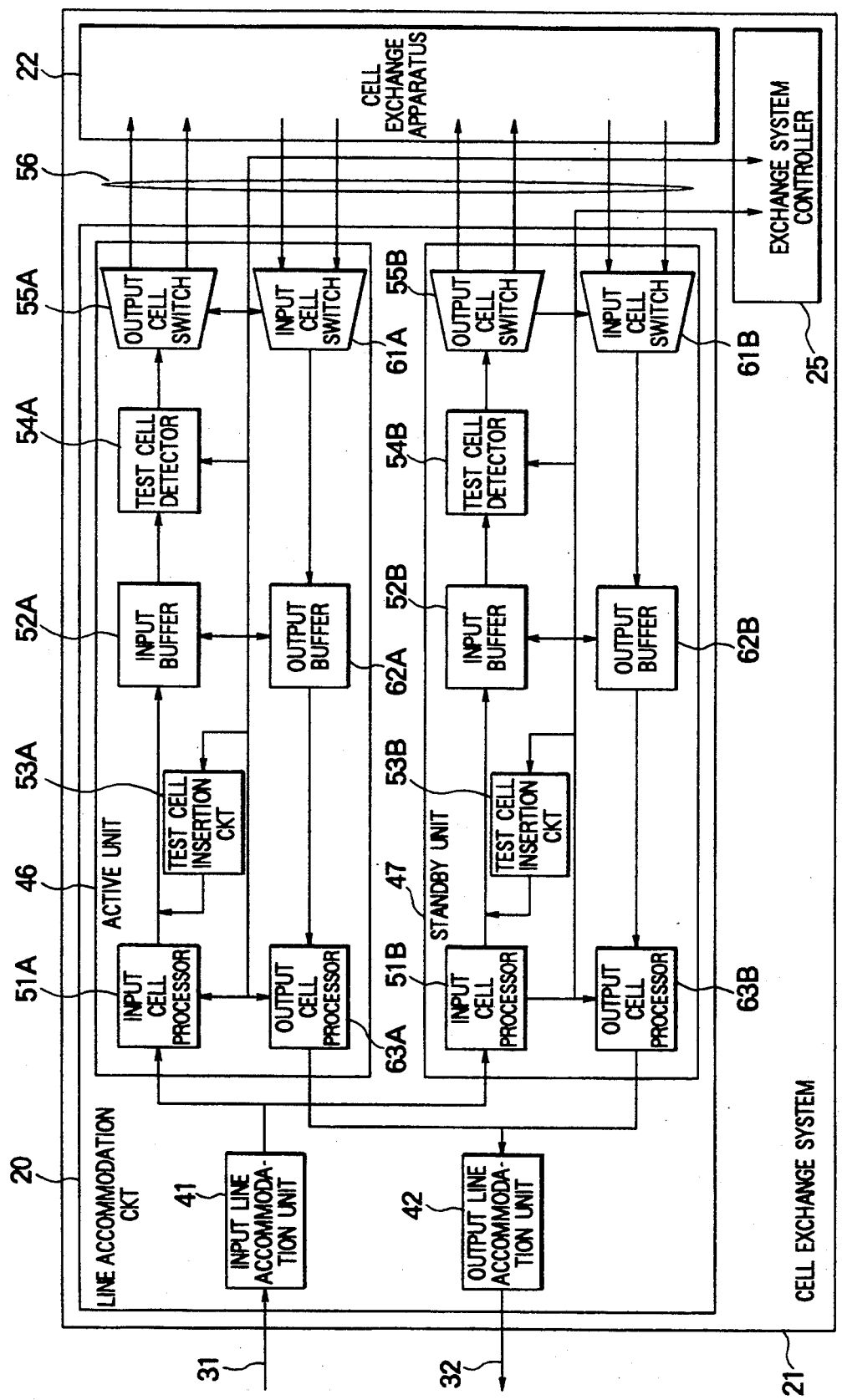
FIG. 1 is a block diagram of a line accommodation circuit according to a preferred embodiment of this invention.

Referring to FIG. 1, a line accommodation circuit 20 according to a preferred embodiment of this invention is included in a cell exchange system, namely, a digital electronic exchange system 21. In the cell exchange system 21, a cell exchange apparatus 22 is also included together with an exchange system controller 25.

As illustrated in FIG. 1, the line accommodation circuit 20 is connected to an external input line 31 and an external output line 32 and internally connected to the cell exchange apparatus 22 and the exchange system controller 25. Herein, it is to be noted that the line accommodation circuit 20 may receive either a synchronous data signal or an asynchronous data signal through the external input line 31 as an input communication signal, although description will be made only about reception of a sequence of the synchronous data signals each of which includes a frame signal or signals in addition to a communication information signal. In addition, the line accommodation circuit 20 produces an output communication signal formed by a synchronous data signal.

Now, the line accommodation circuit 20 comprises an input line accommodation unit 41 connected to the external input line 31, an output line accommodation unit 42, and first and second function units 46 and 47 each of which is connected to both the input and the output line accommodation units 41 and 42 and which is operable in a manner to be described later in detail. Each of the first and the second function units 46 and 47 may be referred to as a function system and is similar in structure and operation to each other. In this connection, elements in the first and the second function units 46 and 47 are specified by affixes A and B attached to reference numerals corresponding to one another, respectively.

Herein, let the first and the second function units 46 and 47 be put into active and inactive states, respectively, and be called active and standby units, respectively. Taking this into consideration, description will be mainly directed to the first function unit, namely, the active unit 46.

The active unit 46 comprises an input cell processor 51A connected to the input line accommodation unit 41, an input buffer 52A connected to the input cell processor 51A, a test cell insertion circuit 53A controlled by the exchange system controller 25 and connected between the input cell processor 51A and the input buffer 52A. A test cell detector 54A is controlled by the exchange system controller 25 and is located between the input buffer 52A and an output cell switch 55A controlled by the exchange system controller 25. The output cell switch 55A is connected to the cell exchange apparatus 22 through internal lines 56.

Moreover, the illustrated active unit 46 further comprises an input cell switch 61A connected to the cell exchange apparatus 22 through the internal lines 56 and controlled by the exchange system controller 25, an output buffer 62A connected to the input cell switch 61A and controlled by the exchange system controller 25, and an output cell processor 63A connected to the output buffer 62A and controlled by the exchange system controller 25. The output cell processor 63A is connected to the output line accommodation unit 42.

Likewise, the standby unit 47 comprises an input cell processor 51B, an input buffer 52B, a test cell insertion circuit 53B, a test cell detector 54B, an output cell switch 55B, an input cell switch 61B, an output buffer 62B, and an output cell processor 63B, all of which are identical with those depicted at the same reference numerals. The following description will be made only about the reception operation of the input communication signal sent through the external input line 31. In other words, an output operation will be omitted from the following description because such an output operation is not directly related to this invention.

As shown in FIG. 1, the synchronous data signal sequence is assumed to be received as the input communication signal through the input line accommodation unit 41 and to be sent to both the input cell processors 51A and 51B of the active and the standby units 46 and 47.

The input cell processor 51B in the standby unit 47 is kept in an inactive state under control of the exchange system controller 25 when the function unit 47 is put into the standby state. Accordingly, the input cell processor 51B stops preliminary processing of the synchronous data signals. As a result, the synchronous data signals are discarded in the input processor unit 51B of the standby unit 47. On the other hand, the input cell processor 51A in the active unit 46 preliminarily processes the synchronous data signal sequence in a manner to be presently described.

In the meanwhile, it is known in the art that each of the synchronous data signals includes an additional data signal, such as the frame synchronization signal, together with the communication information signal.

Figure 2:
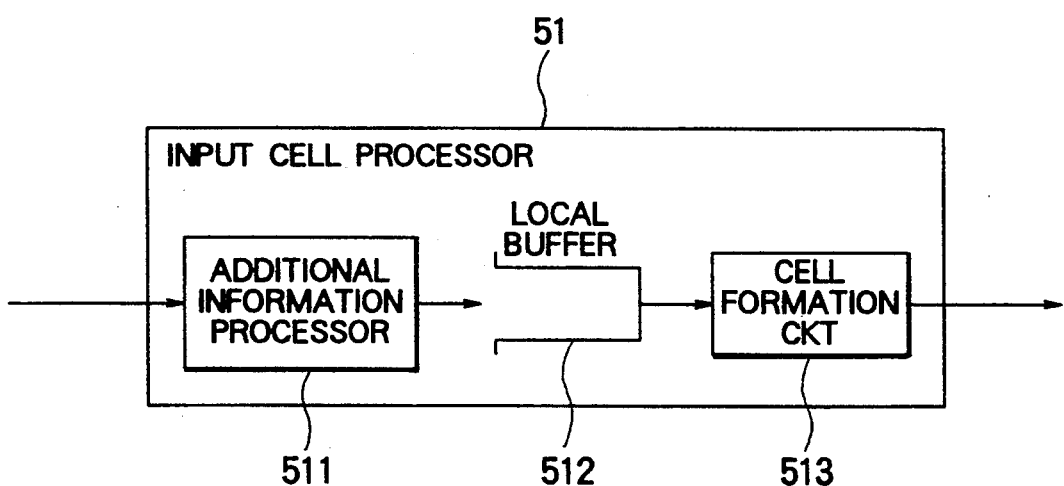
FIG. 2 is a block diagram of a part of the line accommodation circuit illustrated in FIG. 1.

Temporarily referring to FIG. 2 together with FIG. 1, the input cell processor (generally designated as 51) comprises a preliminary processor 511 for eliminating the additional data signal from the synchronous data signal and a local buffer 512 for successively storing the communication information signal to successively produce a stored information signal. The local buffer 512 has a memory capacity for memorizing several tens of ATM cells. A sequence of the stored information signals is sent to a cell formation circuit 513. The cell formation circuit 513 converts the stored information signal or signals into an asynchronous transfer mode (ATM) cell in a known manner. Simply, the stored information signal is assigned to a subscriber communication information area in the ATM cell.

Referring back to FIG. 1, the ATM cell is successively sent to the input buffer 52A of the active unit 46 to be temporarily memorized in the input buffer 52A and to be thereafter sent through the test cell detector 54A and the output cell switch 55A to the cell exchange apparatus 22 under control of the exchange system controller 25. Similar operation is carried out in the active unit 46 as long as no fault is caused to occur in the active unit 46.

Referring to FIGS. 3 through 6, description will be made about a switching operation from the active unit 46 to the standby unit 47 under control of the exchange system controller 25 on the assumption that a fault takes place in the active unit 46. In FIGS. 3 through 6, input units or systems alone are illustrated for brevity of description and, as a result, an output system of each function unit 46 and 47 is omitted from FIGS. 3 through 6.

Figure 3:
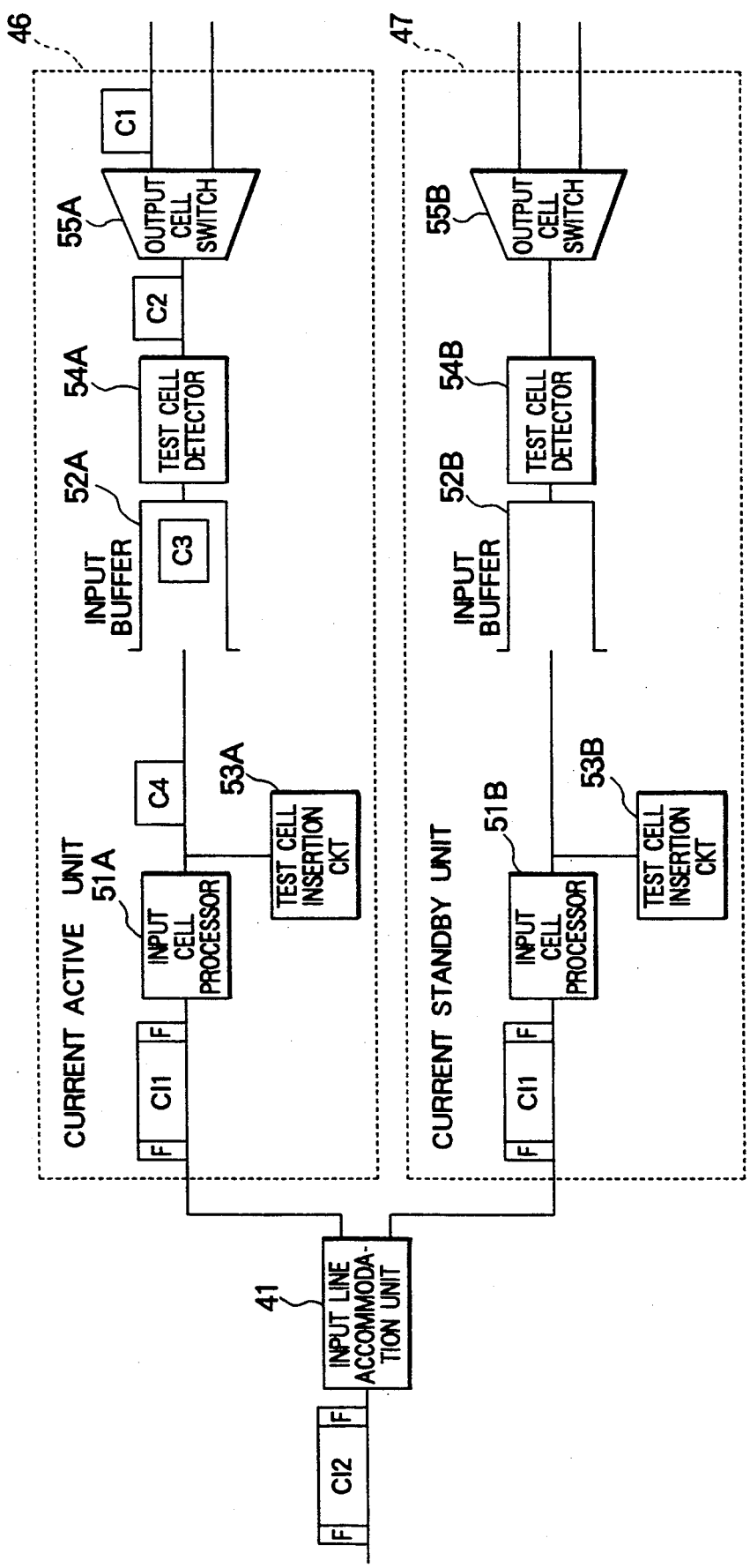
FIG. 3 is a block diagram for use in describing a step of a switching operation carried out in the line accommodation circuit illustrated in FIG. 1.

In FIG. 3, it is assumed that a normal operation is carried out prior to the switching operation of the function units or systems 46 and 47. Further, it is also assumed in FIG. 3 that the function unit 46 is put into the active state and operable as the active unit or system while the function unit 47 is put into the standby state and operable as the standby unit or system, as mentioned in conjunction with FIGS. 1 and 2. In this connection, the function units 46 and 47 illustrated in FIG. 3 are labeled a current active unit and a current standby unit, respectively.

The input data signal sequence is given to the input line accommodation unit 41 through the external input line 31 and is synchronously sent through the line accommodation unit 41 to both the current active unit 46 and the current standby unit 47. In the example illustrated in FIG. 3, one of the input data signals is produced from the input line accommodation unit 41 as a first data signal that is specified by a pair of frame synchronization signals F and a communication information signal CI1 interposed between the frame synchronization signals F. The first data signal is followed by a second communication signal that is given to the input line accommodation unit 41 and that is specified by a communication information signal CI2 and the frame synchronization signals F.

In the current active unit 46 and the current standby unit 47, the first data signal is synchronously received by the input cell processors 51A and 51B. The input cell processor 51B in the current standby unit 47 discards the first data signal, as mentioned before. Therefore, description will be mainly directed to the current active unit 46 is connection with FIG. 3.

On the other hand, the input cell processor 51A in the current active unit 46 processes the first data signal in the following manner. As shown in FIG. 2, the first data signal is given to the additional information processor 511 illustrated in FIG. 2. The additional information processor 511 eliminates the additional information signal from the first data signal to produce an internal data signal. The internal data signal is temporarily memorized or stored in the local buffer 512 and is thereafter sent to the cell formation circuit 513. The cell formation circuit 513 converts the internal data signal into an asynchronous transfer mode (ATM) cell.

Turning back to FIG. 3, it is assumed that the input cell processor 51A previously produce four preceding ATM cells which precede the first data signal and which are depicted as first through fourth ATM cells C1 to C4. As readily understood from FIG. 3, the ATM cells C1 to C4 are successively produced from the first ATM cell C1 to the fourth cell C4. This shows that the first ATM cell C1 is at first sent from the input cell processor 51A.

As long as the current active unit 46 is operated in the normal mode, the test cell insertion circuit 53A is put into an inactive state. Under the circumstances, the fourth ATM cell C4 is sent just before the first data signal to the input buffer 52A which is already loaded with the third cell C3 and which is sent to the test cell detector 54A. On no detection of the test cell, the test cell detector 54A produces a local reception cell as a local output cell, as exemplified by the second cell C2 in FIG. 3. The output cell switch 55A distributes the local output cell to the cell exchange apparatus 22 (FIG. 1) under control of the exchange controller 25. Such an operation is successively carried out as long as the current active unit 46 is operated in the normal mode.

It is to be noted here that the communication information signal CI may be considered as a signal which has a transfer format and which has a known data communication format. The ATM cell converted by the input cell processor 51A depends in number on an amount of information included in the input data signal. In other words, the number of the ATM cells may not be always equal to the number of the communication information signals CI.

Figure 4:
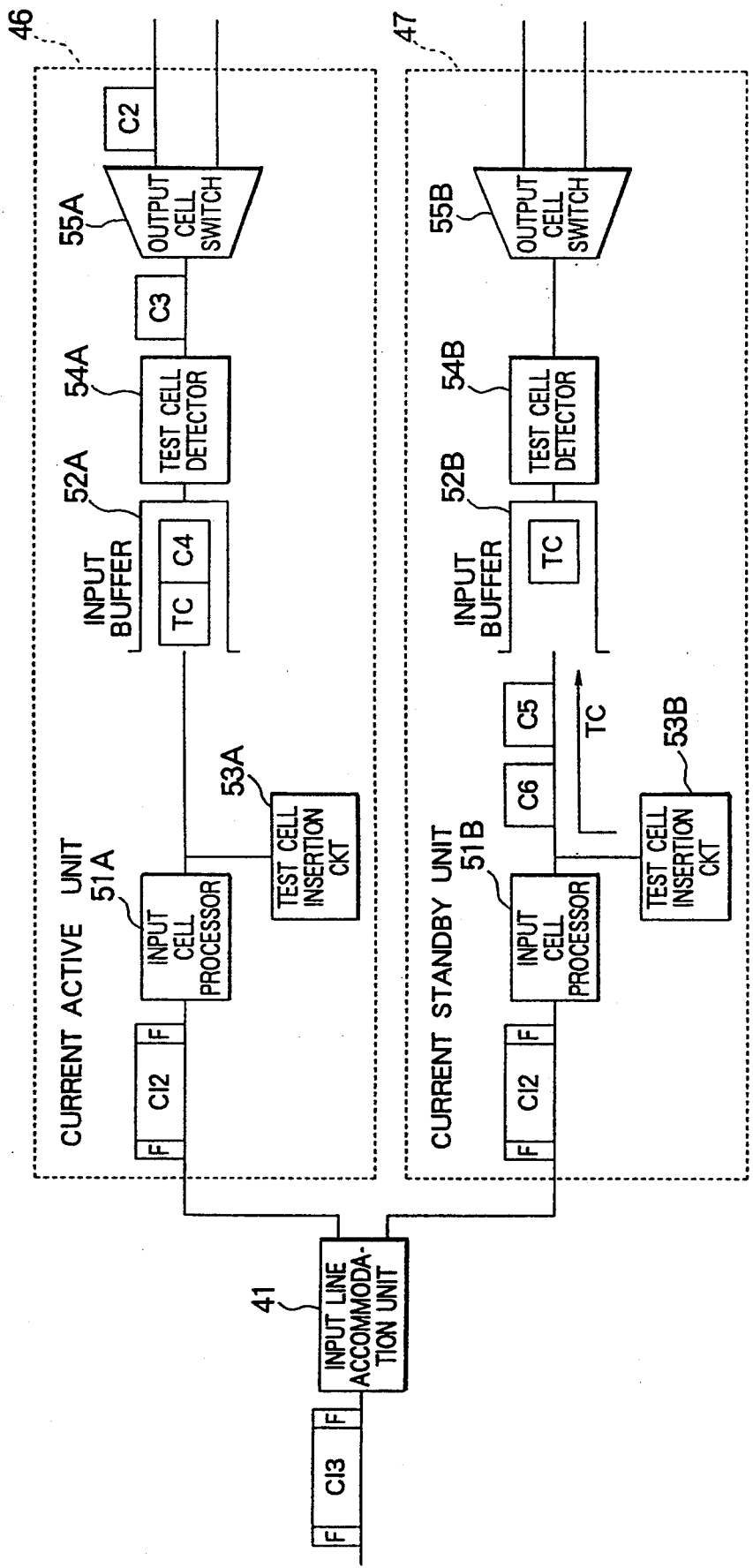
FIG. 4 is a similar block diagram for use in describing another step of the switching operation in the line accommodation circuit illustrated in FIG. 1.

Referring to FIG. 4, it is assumed that the exchange system controller 25 detects a fault in the current active unit 46 and delivers, to both the current active unit 46 and the current standby unit 47, an instruction which indicates preparation of a unit switch operation and which may be called a switching preparation instruction. The switching preparation instruction is delivered as a control signal from the exchange system controller 25 not only to both the input cell processors 51A and 51B but also to the remaining elements of the current active unit 46 and the current standby unit 47, as illustrated in FIG. 1.

In the illustrated example, the switching preparation instruction is assumed to be received by both the current active unit 46 and the current standby unit 47 before the first data signal (CI1) is received by the input cell processors 51A and 51B.

Supplied with the switching preparation instruction through the input line accommodation unit 41, the input cell processor 51A in the current active unit 46 stops processing the input data signal and discards the input data signal which is received after reception of the switching preparation instruction. The illustrated input cell processor 51A converts input data signals left in the input cell processor 51B, into ATM cells, although description is made on the assumption that only one of the input data signals is left in the input cell processor 51A.

In FIG. 4, the input data signal left in the input cell processor 51A is converted into the fourth ATM cell C4 after reception of the switching preparation instruction. On the other hand, the first data signal which includes the communication information signal CI1 is discarded or neglected by the input cell processor 51A.

The switching preparation instruction is successively followed by an input data hold instruction which indicates a hold operation of the following data signals and a test cell insertion instruction. Each instruction is successively delivered from the exchange system controller 25.

The test cell insertion circuit 53A neglects the input data hold instruction and produces a test cell TC in response to the test cell insertion instruction and sends the test cell TC to the input buffer 52A. As a result, the test cell TC is stored in the input buffer 52A after the fourth ATM cell C4, as shown in FIG. 4. Under the circumstances, the test cell detector 54A and the output cell switch 55A produce the third and the second ATM cells C3 and C2, respectively.

On the other hand, the input cell processor 51B is put into an operable state in response to the switching preparation instruction produced prior to the reception of the first data signal. In the illustrated example, the exchange system controller 25 supplies the input cell processor 51B of the current standby unit 47 with the input data hold instruction, although the input data hold instruction is neglected by the input cell processor 51A.

Therefore, the input cell processor 51B successively stores the first data signal and the following data signals exemplified by the second data signal and a third data signal that are specified by the second communication information signal CI2 and a third communication information signal CI3 in FIG. 4, respectively.

After production of the data hold instruction, the exchange system controller 25 supplies the input cell processor 51B with a test cell insertion instruction simultaneously with the input cell processor 51A. In FIG. 4, the test cell insertion circuit 53B sends and stores the test cell TC into the input buffer 52B in synchronism with the test cell insertion instruction. Thus, the test cells TC are simultaneously produced by the test cell insertion circuits 53A and 53B and sent to the input buffers 52A and 52B. Consequently, the input buffer 52B is loaded with the test cell TC as a leading data signal because the input buffer 52B was empty before reception of the test cell insertion instruction, as illustrated in FIG. 4.

When the test cells TC are stored in the input buffers 52A and 52B, the test cell insertion circuits 53A and 53B supplies the exchange system controller 25 with completion signals each of which is representative of completion of inserting the test cells TC into the input buffers 54A and 54B.

Supplied with the completion signals, the exchange system controller 25 supplies an operation restart instruction to the current active unit 46 and the current standby unit 47. Specifically, the exchange system controller 25 instructs the input cell processor 51A of the current active unit 46 to continue a cell discard operation. Simultaneously, the exchange system controller 25 instructs the input cell processor 51B of the current standby unit 47 to carry out a cell conversion operation in connection with an input data signal already held in the input cell processor 51B and the following input data signals, such as the second and the third communication data signals CI2 and CI3.

Responsive to an instruction for the cell conversion operation, the input cell processor 51B of the current standby unit 47 converts the first data signal already held in the input cell processor 51B into fifth and sixth ATM cells C5 and C6 in the manner mentioned in conjunction with FIG. 2. The fifth and the sixth ATM cells C5 and C6 are successively stored in the input buffer 52B after the test cell TC, as illustrated in FIG. 4.

From this fact, it is readily understood that the input buffer 52A in the current active unit 46 is loaded with the fourth ATM cell C4 which carries a last valid data signal produced before the unit switching operation while the input buffer 52B in the current standby unit 47 is loaded with ATM cells which carry valid data signal and which appear after the test cell TC. Thus, the test cell TC indicates a switching point from the current active unit 46 to the current standby unit 47.

Figure 5:
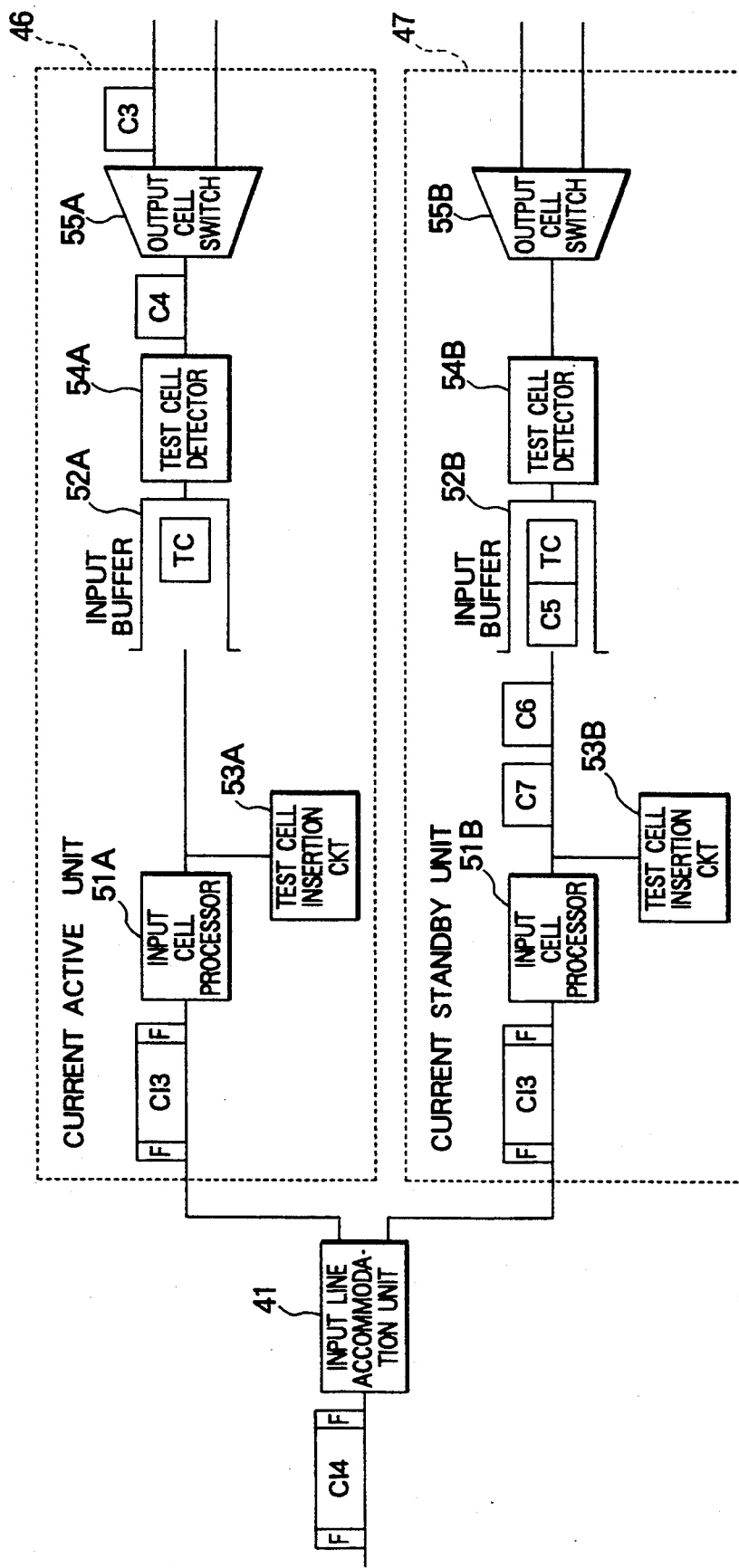
FIG. 5 is a similar block diagram for use in describing a next step of the switching operation.

Referring to FIG. 5, description will be made about a test cell (TC) detection operation which is executed after insertion of the test cell TC, as mentioned with reference to FIG. 4. In the current active unit 46, the test cell detector 54A is at first supplied with the fourth ATM cell C4 from the input buffer 52A after the test cell TC is stored in the input buffer 52A. The fourth ATM cell C4 is allowed to pass through the test cell detector 54A. Thereafter, the test cell TC is sent from the input buffer 52A to the test cell detector 54A and is detected by the test cell detector 54A. On detection of the test cell TC, the test cell detector 54A sends a detection signal indicative of the detection of the test cell TC to the exchange system controller 25. Thus, it is to be noted that the detection signal is produced after passage of the fourth ATM cell C4. In other words, the input buffer 52A produces each ATM cell until detection of the test cell TC.

On the other hand, the test cell detector 54B in the current standby unit 47 is at first given the test cell TC from the input buffer 52B to produce the detection signal, like the test cell detector 54A. Accordingly, the test cell TC is produced from the current standby unit 47 prior to production of the test cell TC from the current active unit 46. After production of the test cell TC from the input buffer 52B, the input buffer 52B is thereafter successively loaded with the following ATM cells, such as the fifth ATM cell C5, and so on.

Figure 6:
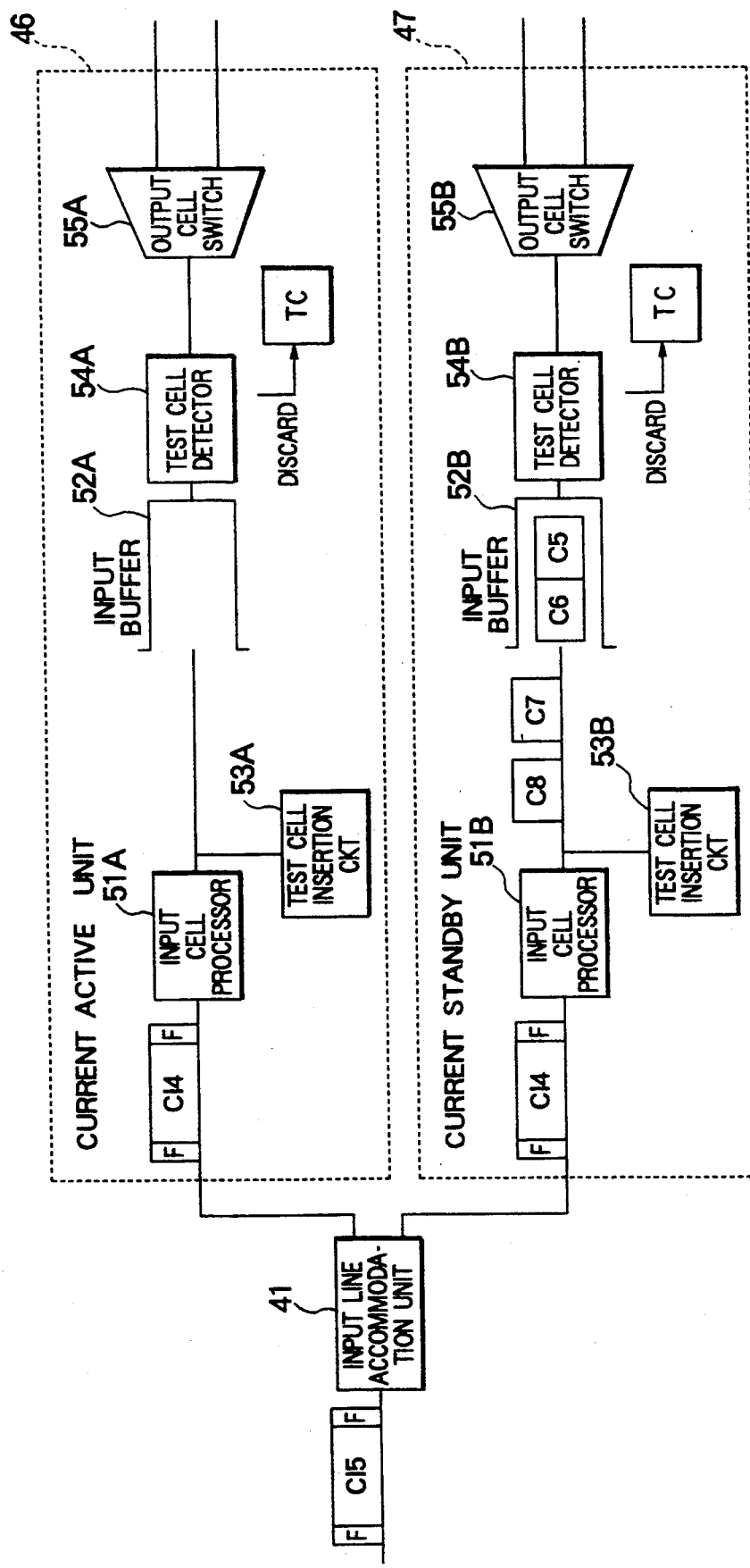
FIG. 6 is a similar block diagram for use in describing a following step of the switching operation.

Referring to FIG. 6, the exchange system controller 25 is supplied with the detection signal from the test cell detector 54B. The exchange system controller 25 sends the input buffer 52B an indication or instruction of holding and producing ATM cells, such as the fifth and the sixth ATM cells C5 and C6, and thereafter sends the test cell detector 54B an indication of discarding the test cell TC. Alternatively, the exchange system controller 25 sends the test cell detector 54A only the indication or instruction of discarding the test cell TC.

Thus, the current active unit 46 and the current standby unit 47 are switched from one to another. As a result, the current active unit 46 is changed to a new standby unit while the current standby unit 47 is change to a new active unit, as illustrated in FIG. 6. Consequently, the system or unit switching operation is finished by switching both the units 46 and 47 from one to another.

Responsive to the indication of producing the ATM cells, the ATM cells stored in the input buffer 52B are successively produced from the fifth ATM cell C5 and are sent through the output cell switch 55B and the system internal lines 56 to the cell exchange apparatus 22.

In the new standby unit 46, the input data signals which are given to the input cell processor 51A are not converted into ATM cell and put into a standby state to be discarded by the input cell processor 51A. In consequence, none of ATM cells are sent to the following elements, such as the input buffer 52A.

In the above example, a sequence of indications or instructions is successively produced from the exchange system controller 25. Such indications and instructions may be, for example, the switching preparation instruction, the instruction of holding the following communication information, and the processing restart instruction. They may be delivered as the control signals to each input cell processor 51A and 51B of both the current active unit 46 and the current standby unit 47. At any rate, the control signals appear at the same timing and are synchronously delivered to both of the units 46 and 47. Using such control signals makes it possible to switch the units from one to another in a high speed communication system. In addition, if each of the input cell processors 51A and 51B can identify such a control signal during each operation, the merit is increased more and more.

Furthermore, a sequence of processing operations may be automatically executed in the units 46 and 47 after reception of the switching preparation instruction sent from the exchange system controller 25.

As mentioned before, the system switching operation is carried out by interrupting ATM cell conversion operation of the current active unit and the current standby unit, by inserting the test cells with input data signals kept in both of the units, and by restarting the ATM cell conversion operation. Furthermore, when the test cells are detected in output stages of the current active and the current standby units 46 and 47, it is judged that the current active unit 46 finishes producing all ATM cell received prior to the system switching operation and discards the test cell. On the other hand, the ATM cells which are produced after the system switching operation are successively sent from the current standby unit.

With this structure, it is possible to smoothly switch the system switching operation from one to another even in course of communication without lack or loss of any communication information signal. In addition, it is possible to reduce a transfer delay of a communication information signal which might occur on the system switching operation and to decrease a load which is imposed on an external connection apparatus and which results from transmission suppression control. This brings about a high speed real time communication operation.

What is claimed is:

1. A line accommodation circuit supplied with a sequence of input data signals to supply a sequence of output asynchronous transfer mode cells to a cell exchange apparatus, said line accommodation circuit comprising a first function system which is operated as an active system and a second function system which is identical in structure with said first function system and is operated as a standby system, said first and second function systems being responsive to a system controller for carrying out a switching operation between said active and said standby systems to render said first and said second function systems into a new standby system and a new active system, respectively, said input data signal sequence being synchronously sent to both the active and the standby systems, each of said first and said second function systems comprising:

a controllable cell processor controlled by said system controller for successively carrying out, under control of said system controller, a conversion operation of said input data signals into internal asynchronous transfer mode cells corresponding to said output asynchronous transfer mode cells;

a cell insertion circuit coupled to said system controller for producing, under control of said system controller, a predetermined cell distinguished from said internal asynchronous transfer mode cells;

an input buffer coupled to said system controller for storing said internal asynchronous transfer mode cells and said predetermined cell to produce said internal asynchronous transfer mode cells and said predetermined cell as stored asynchronous transfer mode cells and a stored predetermined cell, respectively, under control of said system controller;

a cell detector coupled to said system controller and said input buffer for detecting said stored predetermined cell to supply a detection signal to said system controller on detection of said stored predetermined cell and, otherwise, to allow said stored asynchronous transfer mode cells to pass therethrough under control of said system controller; and an output circuit coupled to said system controller and said cell detector for producing said stored asynchronous transfer mode cells as said output asynchronous transfer mode cells under control of said system controller;

the active system being controlled on said switching operation by said system controller so that the cell processor in the active system transmits to the input buffer of the active system a last one of the internal asynchronous transfer mode cells and thereafter stops said conversion operation and the cell insertion circuit in said active system produces said predetermined cell following said transmission of said last one of the internal asynchronous transfer mode cell;

the standby system being controlled on said switching operation by said system controller so that the cell processor in the standby system starts the conversion operation after said predetermined cell is sent from said cell insertion circuit to said input buffer in the standby system, to store, in said input buffer of the standby system, a following one of the internal asynchronous transfer mode cells that succeeds said last one of the asynchronous transfer mode cells, with said following one of the internal asynchronous transfer mode cells preceded by said predetermined cell in the input buffer of the standby system.

2. A line accommodation circuit as claimed in claim 1, wherein the input buffer in the active system is controlled on said switching operation by said system controller so that the last one of the internal asynchronous transfer mode cells and the predetermined cell are successively produced without the following one of the internal asynchronous transfer mode cells from the input buffer in the active system as a last one of said stored asynchronous transfer mode cells and the stored predetermined cell while the input buffer in the standby system is controlled on said switching operation by said system controller so that the predetermined cell and the following one of the internal asynchronous transfer mode cells are successively produced from the input buffer in the standby system as the stored predetermined cell and an initial one of the stored asynchronous transfer mode cells, respectively.

3. A line accommodation circuit as claimed in claim 2, wherein the cell detector in the active system is controlled by said system controller on the switching operation so that the detection signal is produced as a first detection signal after passage of the last one of the stored asynchronous transfer mode cells while the cell detector in the standby system is controlled by said system controller on the switching operation so that the detection signal is produced as a second detection signal prior to production of said first detection signal and said following one of the internal asynchronous transfer mode cells.

4. A line accommodation circuit as claimed in claim 3, wherein said input buffer in the standby system is controlled by said system controller so that the stored asynchronous transfer mode cells are produced after both said first and said second detection signals are supplied to the system controller to make said standby system operate as the new active system and to render said active system into the new standby system.

5. A system switching method for use in a line accommodation circuit which is supplied with a sequence of input data signals to supply a sequence of output asynchronous transfer mode cells to a cell exchange apparatus by carrying out a conversion operation of said input data signals into internal asynchronous transfer mode cells corresponding to said output asynchronous transfer mode cells, said line accommodation circuit comprising a first function system which is operated as an active system and a second function system which is identical in structure with said first function system and is operated as a standby system, said input data signal sequence being synchronously sent to both the active and the standby systems, said system switching method being for carrying out a switching operation from said active system to said standby system to render said active and said standby systems into new standby and new active systems, respectively, said systgem switching method comprising the steps of:

stopping said conversion operation in said active system on the switching operation;

producing, in said active system, a predetermined cell which is distinguished from said internal asynchronous transfer mode cells and which follows a last one of the internal asynchronous transfer mode cells left in the active system;

successively storing, in said active system, the last one of the internal asynchronous transfer mode cells and the predetermined cell;

producing, in said standby system, said predetermined cell synchronized with that produced in the active system;

starting the conversion operation in the standby system after production of said predetermined cell;

successively storing, in said standby system, the predetermined cell and a following one of the internal asynchronous transfer mode cells that follows the last one of the internal asynchronous transfer mode cells and that is preceded by said predetermined cell.

6. A system switching method as claimed in claim 5, further comprising the steps of successively producing, on said switching operation in said active system, the last one of the internal asynchronous transfer mode cells and the predetermined cell without the following one of the internal asynchronous transfer mode cells; and successively producing, on said switching operation in said standby system, the predetermined cell and the following one of the internal asynchronous transfer mode cells.

7. A system switching method as claimed in claim 6, further comprising the steps of:

detecting, in said active system, said predetermined cell after production of the last one of the stored asynchronous transfer mode cells to produce a first detection signal indicative of detection of said predetermined cell;

detecting, in said standby system, said predetermined cell before production of said following one of the internal asynchronous transfer mode cell to produce a second detection signal indicative of detection of said predetermined cell.

8. A system switching system as claimed in claim 7, further comprising the steps of:

successively producing, in said standby system, the internal asynchronous transfer mode cells after production of both the first and the second detection signals to make said standby system operate as the new active system;

stopping, in said active system, the conversion operation to render the active system into the new standby system.

* * * * *

UNITED STATES PATENT AND TRADEMARK OFFICE
CERTIFICATE OF CORRECTION

PATENT NO.   : 5,406,548
DATED        : April 11, 1995
INVENTOR(S)  : Chikashi ITOH et al.

It is certified that error(s) appears in the above-identified patent and that said Letters Patent is hereby corrected as shown below:

Title page:
Abstract, line 11, delete "placed".

Col. 10, line 30, delete "cell" and insert --cells--.

Col. 11, line 33, delete "systgem" and insert --system--.

Signed and Sealed this

Twenty-third Day of January, 1996

*Attest:*

BRUCE LEHMAN

*Attesting Officer*     Commissioner of Patents and Trademarks